A. M. LEONI.
TRUCK WHEEL.
APPLICATION FILED MAY 3, 1921.
Reissued May 30, 1922 15,367.
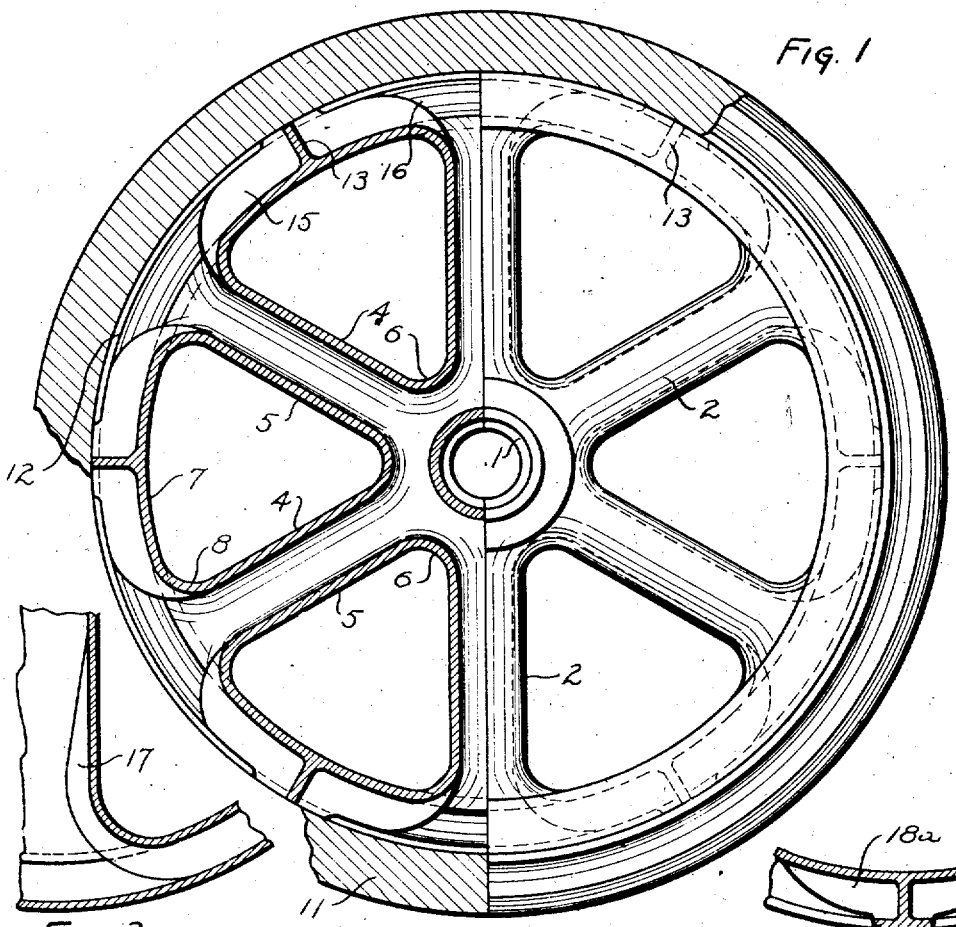
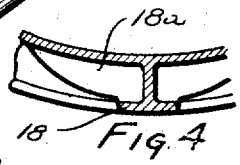
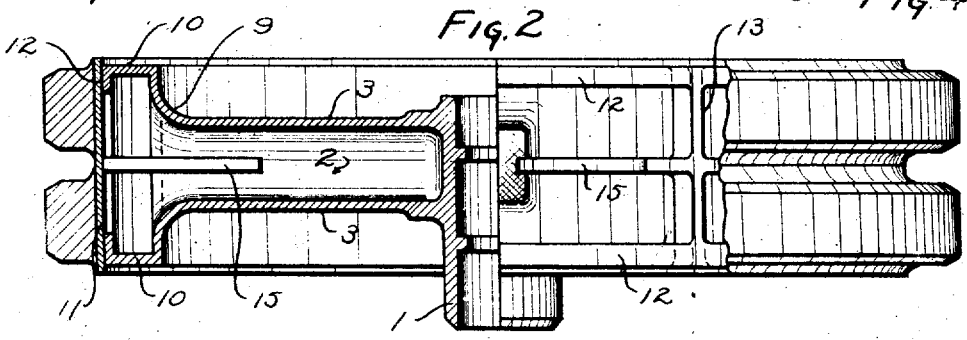
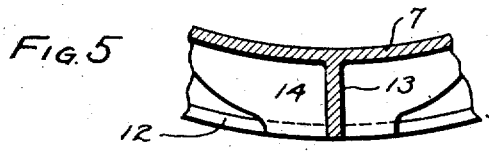
INVENTOR
Alfonso M. Leoni
BY
Toulmin & Toulmin
ATTORNEY

UNITED STATES PATENT OFFICE.

ALFONSO M. LEONI, OF BALTIMORE, MARYLAND, ASSIGNOR, BY MESNE ASSIGNMENTS, TO THE DAYTON STEEL FOUNDRY COMPANY, OF DAYTON, OHIO.

TRUCK WHEEL.

15,367. Specification of Reissued Letters Patent. Reissued May 30, 1922.

Original No. 1,201,597, dated October 17, 1916, Serial No. 88,393, filed April 1, 1916. Application for reissue filed May 3, 1921. Serial No. 466,597.

*To all whom it may concern:*

Be it known that I, ALFONSO M. LEONI, a citizen of the United States of America, residing at Baltimore, in the city of Baltimore and State of Maryland, have invented new and useful Improvements in Truck-Wheels, of which the following is a specification.

This invention relates to wheels and particularly to those of a heavy type such as employed on trucks.

The invention is particularly useful when applied to the construction of integral cast wheels.

A principal object of the invention is to produce a wheel of great strength and resiliency, and having improved features of construction at the junction points of the spokes and rim tending to prevent the formation of cracks and the splitting of the rim.

Another object is to give the wheel an advantageous form of rim effectively correlated to the features of construction of the spokes to adequately support a rim for a tire.

The invention consists in the general combination of parts and in the features described in the following specification while the broad scope of the invention is set forth in the appended claims.

In the drawing, Figure 1 is a partial side elevation and section of a wheel embodying my invention. Fig. 2 is a plan or face view of the wheel partially broken away to show the wheel partially in section. Fig. 3 is an enlarged section in the plane of the wheel showing a detail of a modified embodiment of features of the invention. Fig. 4 is a section at the rim intermediate of the spokes and showing another modified embodiment of features of the invention. Fig. 5 is a similar view showing the embodiment of the invention illustrated in Fig. 1.

The wheel preferably comprises a hub 1 in the form of a sleeve, from which radiate spokes 2 which are preferably of slightly tapered tubular form and integrally connected with the hub through the side walls 3 of the spokes.

In order to give the wheel increased resiliency and lightness at the hub I prefer to leave the front and rear walls 4 and 5 of the spokes unattached directly to the hub but I prefer to connect the rear wall of each spoke with the forward wall of the adjacent spoke, by an integral curved wall 6 preferably struck on a relatively great radius.

The rim of the wheel is preferably constructed so as to absorb shocks and so as to impart them resiliently to the spokes. For this purpose I prefer to form the rim with an inner circumferential wall 7 which is integrally united with the forward and rear walls of the spokes by extending these walls of the spokes in broadly sweeping curves 8 which merge into the circumferential wall. For the same purpose I also prefer to give the rim of the wheel a hollow form, and in order to do this I prefer to form the rim with integral side walls 10 which lie in the plane of the wheel and project away from the axis of the wheel.

In order to carry the tire 11 I prefer to provide the walls 10 with separated extensions or inward projections 12 which form seats for and constitute means for attaching the tire, and preferably these projections 12 are in the form of continuous flanges.

In order to tie the flanges 12 together I prefer to provide the rim, intermediate of the spokes, with webs 13 and 14. These webs if desired may be of a depth substantially equal to the depth of the rim, so that the outer edge of the web is flush with the outer faces of the flanges, but portions of the webs as at 18[a] may be depressed below the outer faces of the flanges. To give these intermediate parts of the rim greater strength, I also may extend the longitudinal webs as at 15, which are preferably located in the central plane of the wheel, and which intersect the transverse webs to form a unit web. This last mentioned type of webs preferably has a portion 14 of substantially equal depth with the rim, and their edges 16 curve away toward and merge into the forward and rear walls of the spokes, thus having their major portions depressed between the outer faces of the flanges. Thus some of the webs may have portions of the web portions flush with the outer surface of the rim and others may have portions depressed below the outer surface of the rim.

If it is desired to strengthen the spokes the longitudinal webs may have long tapering extensions 17 (see Fig. 1) which run in on the spokes and merge or die away on the inner faces of the forward and rear walls of the spokes.

If it is desired to form more of a seat for the tire, I may form the outer edge of each transverse web with a flange such as at 18 (see Fig. 4), and this of course increases the strength of the wheel locally. The longitudinal webs in this case may be short and of such a form as indicated at 18ª (see Fig. 4.)

One of the functions of the transverse webs is to prevent local lateral forces in the wheel from tending to split apart the sides of the wheel at the rim. Such forces may be developed while the wheel is passing on a curve or where the roadway inclines laterally with respect to a horizontal line. The transverse webs also operate beneficially by increasing the connected mass which of course tends to absorb a shock.

The small extent of the longitudinal ribs that is of fullest depth (see Fig. 5) is advantageous because it leaves a greater extent of the ribs free to vibrate and in that way absorb shocks. The wheel is mud and dust proof as there are no projecting surfaces to catch material.

It is understood that the embodiment of the invention set forth herein, is only one of the many embodiments the invention may take, and I do not wish to be limited in the practice of my invention nor in my claims to the particular embodiment set forth.

What I claim is:

1 As a new article of manufacture an integral metal wheel having a hub, a plurality of substantially tubular spokes disposed radially from said hub, a rim having an inner circumferential wall, the forward and rear walls of said spokes extended in broadly sweeping curves merging into the said circumferential wall of said rim, said rim having integral side walls extending substantially in the plane of the wheel, and having separated webs projecting inwardly from the outer edges of the side walls of said rim for supporting a rim on said wheel.

2. As a new article of manufacture an integral metal wheel having a hub, a plurality of substantially tubular spokes disposed radially from said hub, a rim having an inner circumferential wall, the forward and rear walls of said spokes extending in broadly sweeping curves merging into the said circumferential wall of said rim, said rim having integral side walls extending substantially in the plane of the wheel, united by integral transverse webs intermediate said spokes and having separated extensions projecting inwardly from the outer edges of the side walls of said rim for supporting a tire and rim on said wheel.

3. As a new article of manufacture an integral metal wheel having a substantially cylindrical hub, a plurality of substantially tubular spokes disposed radially from said hub, a rim, the forward and rear walls of said spokes extended in sweeping curves merging into the wall of said rim, the said forward and rear walls of said spokes at the inner ends of the spokes connected by an integral curved wall, said curved wall unattached directly to said hub, the side walls of said spokes connected with both ends of said hub.

4. As a new article of manufacture an integral metal wheel having a hub, a plurality of substantially tubular spokes disposed radially from said hub, a rim having an inner circumferential wall, the forward and rear walls of said spokes extended in sweeping curves merging into the said circumferential wall of said rim, said rim having integral side walls extending substantially in the plane of the wheel, and longitudinal webs lying substantially in the plane of the wheel and extending circumferentially along the rim between the side walls thereof, said webs terminating in broadly sweeping curves merging into the forward and rear walls of said spokes.

5. As a new article of manufacture an integral metal wheel having a hub, a plurality of substantially tubular spokes disposed radially from said hub, a rim having an inner circumferential wall, the forward and rear walls of said spokes extended in sweeping curves merging into the said circumferential wall of said rim, said rim having integral side walls extending substantially in the plane of the wheel, and longitudinal webs lying substantially in the plane of the wheel and extending circumferentially along the rim between the side walls thereof, said webs terminating in broadly sweeping curves merging into the forward and rear walls of said spokes, said rim having integral inwardly projecting flanges, and transverse webs intersecting said longitudinal webs and connecting the said side walls of said rim, some of the webs having portions flush with the outer surface of the rim and others having portions depressed below the outer surface of the rim.

6. As a new article of manufacture an integral metal wheel having a hub, a plurality of substantially tubular radially disposed spokes, a rim having an inner circumferential wall, the forward and rear walls of said spokes extended in sweeping curves merging into the said circumferential wall, said rim having side walls extending away from the axis beyond the circumferential wall, said wheel being open between said side walls throughout substantially the entire circumference thereof, except for webs tying the rim walls to one another.

7. As a new article of manufacture an integral metal wheel having a hub, a plurality of substantially tubular spokes, a rim having an inner circumferential wall, and outwardly extending side walls at the edges of said circumferential wall, the forward and rear walls of said spokes extended in sweeping curves merging into the said circumferential wall, the side walls of said spokes extended in curves merging into the said circumferential wall, said wheel being open between said side walls throughout substantially the entire circumference thereof.

8. As a new article of manufacture, a metal wheel having a hub, a plurality of spokes and a rim, said rim having its outer wall opened throughout and the flanges of said rim tied together by webs, some of the webs having portions flush with the outer surface of the rim and others having portions depressed below the outer surface of the rim.

9. As a new article of manufacture, a metal wheel having a hub, a plurality of spokes and a rim, said rim having its outer wall opened throughout and the flanges of said rim tied together by webs, the webs being flush with the walls of the rim at the points of connection and depressed below the surface of the rim between said walls.

10. As a new article of manufacture, a metal wheel having a hub and a rim, tubular spokes connecting said hub and rim, said rim having its outer wall open throughout and the flanges of said rim tied together by webs, some of the webs having portions flush with the outer surface of the rim and others having portions depressed below the outer surface of the rim.

11. As a new article of manufacture, a metal wheel having a hub, and a rim, tubular spokes connecting said hub and rim, and inwardly extending flanges on said rim connected by webs, portions of which are below the surface thereof, said rim having its outer wall open throughout, the webs being flush with the walls of the rim at the points of connection and depressed below the surface of the rim between said walls.

In testimony whereof I affix my signature.

ALFONSO M. LEONI.